C. E. ROGERS.
APPARATUS FOR AND METHOD OF DESICCATING FLUIDS.
APPLICATION FILED MAY 8, 1915.

1,297,496.

Patented Mar. 18, 1919.
2 SHEETS—SHEET 1.

WITNESS:

INVENTOR.
CHARLES E. ROGERS.
BY
ATTORNEY

C. E. ROGERS.
APPARATUS FOR AND METHOD OF DESICCATING FLUIDS.
APPLICATION FILED MAY 8, 1915.

1,297,496.

Patented Mar. 18, 1919.
2 SHEETS—SHEET 2.

WITNESS:

INVENTOR
CHARLES E. ROGERS,
BY
ATTORNEY.

UNITED STATES PATENT OFFICE.

CHARLES E. ROGERS, OF DETROIT, MICHIGAN.

APPARATUS FOR AND METHOD OF DESICCATING FLUIDS.

1,297,496.  Specification of Letters Patent.  Patented Mar. 18, 1919.

Application filed May 8, 1915. Serial No. 26,712.

*To all whom it may concern:*

Be it known that I, CHARLES E. ROGERS, a citizen of the United States, residing at Detroit, county of Wayne, State of Michigan, have invented a certain new and useful Improvement in Apparatus for and Methods of Desiccating Fluids, and declare the following to be a full, clear, and exact description of the same, such as will enable others skilled in the art to which it pertains to make and use the same, reference being had to the accompanying drawings, which form a part of this specification.

This invention relates to a process of desiccating milk or other liquids or semi-liquids containing solids, and an object of the invention is a method whereby such liquids may be reduced to a dry, granular form without altering the chemical constituents or natural characteristics of the solids thereof whereby, upon the addition of a sufficient quantity of water, a liquid having the consistency and all natural characteristics of the original fluid may be obtained. A further object of this invention is a method of reducing fluids to a substantially dry, granular form that is completely and readily soluble in water. An additional object of the invention is a method that is inexpensive to perform requiring apparatus of comparatively inexpensive type and that is economical as no waste of the product occurs and the amount of heat required is reduced to a minimum.

In the present state of the art the most successful method of desiccating fluids, particularly milk, consists in spraying the fluid into a current of heated air having a temperature usually of about 225 degrees F. and while the product thus obtained is not readily completely soluble in water the characteristics of the product also differ from that of the original fluid to a greater or less degree by reason of the extreme heat to which such solids have been subjected and also due to the forcing of the liquid through a very fine aperture in the spray nozzle which, in the case of milk, breaks up and disintegrates the fat globules. In the process herein disclosed milk, or skimmed milk, either in a natural or condensed state, is spread in the form of a thin film on a traveling surface and is then brought into direct contact with currents of dry heated air at several points which, in passing thereover, quickly absorb and remove the moisture from the product leaving the solids practically dry and unaltered in chemical or physical form. As is hereinafter more fully shown a substantially dry granular product may be produced by my improved process with a less degree of heat than is possible with the usual spray processes above mentioned, the air utilized having a temperature of only about 125 degrees F., which is insufficient to cause chemical change and desiccation is accomplished without the loss of product usual with the spray processes wherein the solids are reduced to a very fine powder.

In order that others skilled in the art may be enabled to perform the process herein disclosed I have shown somewhat diagrammatically and described my preferred apparatus and mode of performing the process, the novel features of which are hereinafter more fully described and claimed and shown in the accompanying drawings in which—

Similar characters refer to similar parts throughout the drawing and specification.

Figure 1:
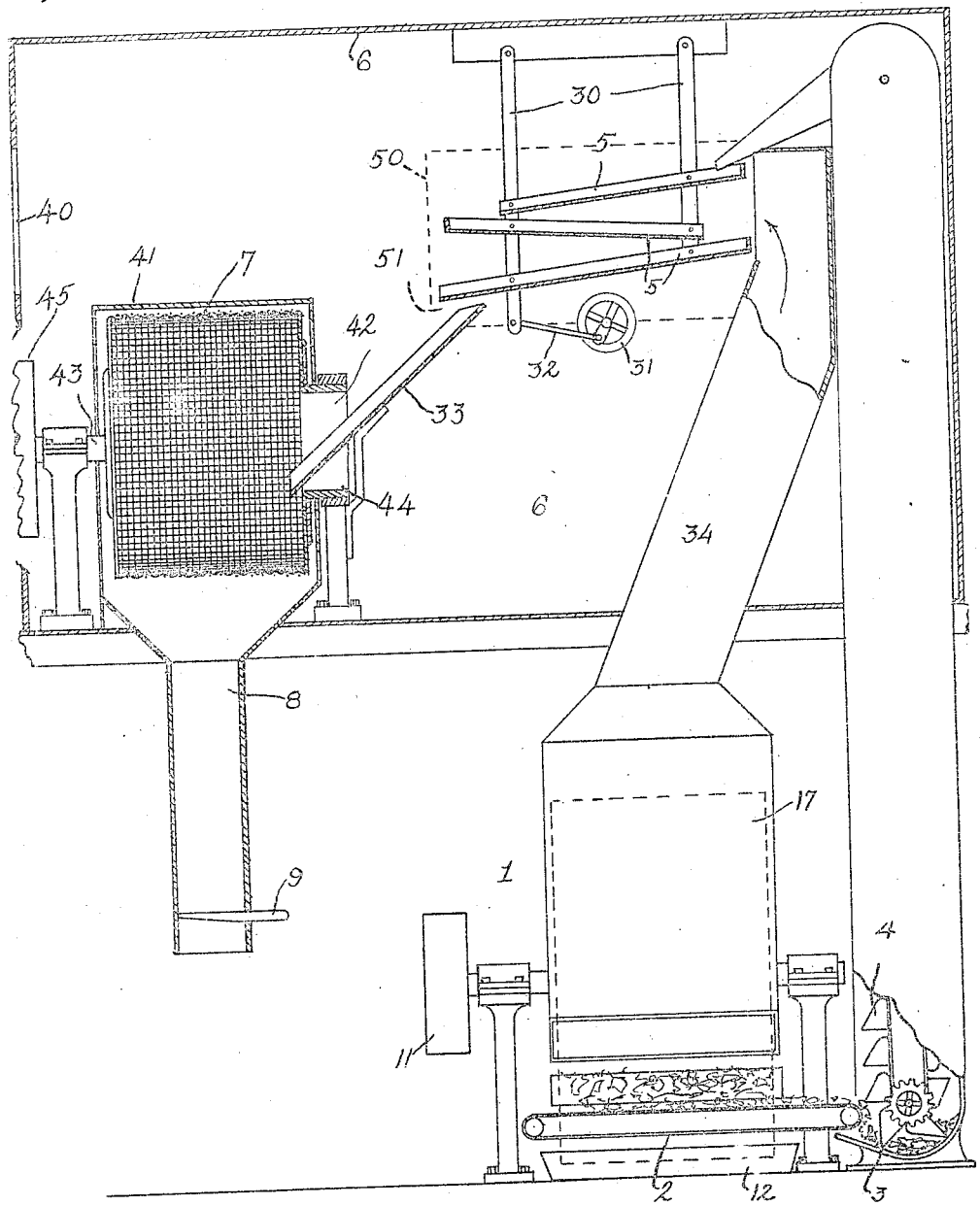
Figure 1 shows a general view of the apparatus and the preferred arrangement thereof for performing my improved process of desiccating fluids.
Figure 2:
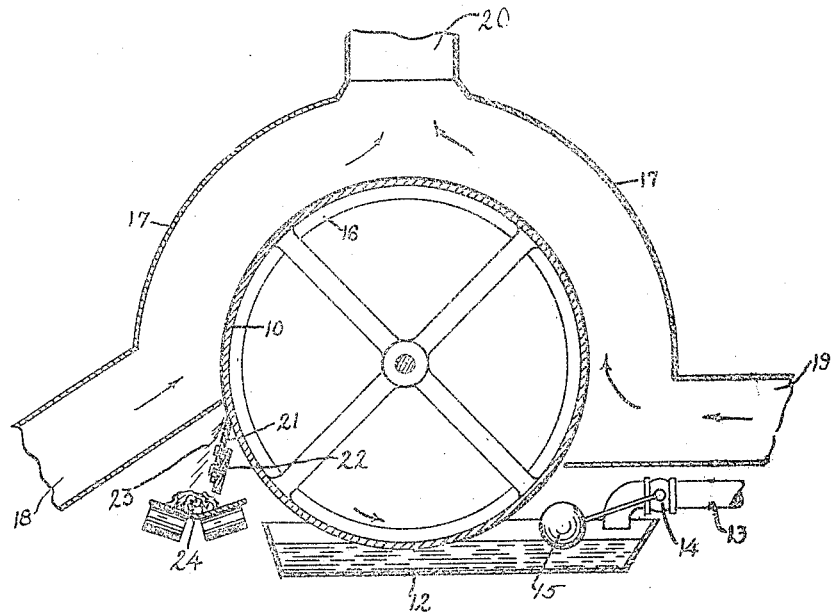
Fig. 2 is a sectional view of the drying element showing the roll and a means of drying a film of fluid thereon.
Figure 3:
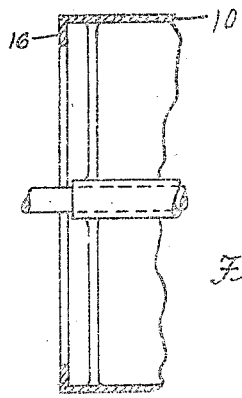
Fig. 3 is a detail of a portion of the roll.

Apparatus suitable for the performance of the process is shown in general and somewhat diagrammatic form in the drawings, and consists of a drying apparatus 1 from which the material is delivered onto a traveling belt 2 in a form having the characteristics of a substantially dry film more or less broken. This belt delivers the material into the conveyer boot 3 from which it is taken by the bucket conveyer 4, and delivered onto the shakers 5 in an upper room or compartment 6. From the shakers the material is delivered into a housed tumbler 7, the periphery of which is formed by a screen of very fine mesh. The dry material in being tumbled by the rotating screen passes therethrough into a hopper 8 from which it may be delivered in any convenient manner, as by means of a gate 9, into a receptacle of the desired nature. As shown more clearly in Fig. 2, the drying apparatus 1 consists of a wheel or roll 10 mounted for rotation in bearings as indicated in Fig. 1, and having a central shaft provided with a belt wheel 11 whereby it may be rotated. Below the wheel is a pan 12 into which the fluid flows through the pipe 13 connected with the source of supply. This pipe 13 is provided with a valve 14 as indicated, which is controlled by a float 15, whereby the fluid level is maintained substantially constant at such point that the surface of the roll 10 contacts the fluid. If so desired the roll may be flanged at 16 as shown in Fig. 3, so that the fluid cannot flow into the interior of the roll.

Above the pan, the surface of the roll is inclosed by a casing 17 having an inlet 18 on one side and an inlet 19 on the opposite side through both of which air may be forced by means of blowers, the air passing over steam coils or other heating element whereby it may be dried and its temperature regulated. A discharge opening 20 is provided at the top of the casing substantially over the center of the roll. The roll is made to rotate slowly in the direction indicated by the arrow and as the surface thereof passes through the liquid in the pan it becomes covered with a thin film of the liquid. As the roll continues to rotate, this film is first brought into the influence of the air passing into the inlet 19, and as the rotation of the roll continues, the film is subsequently brought into contact with the air from the inlet 18, as it passes the outlet 20. From this point forward the film is subjected to air that continuously becomes warmer as it approaches the inlet 18.

I have found in practice that the thin film of fluid should be subjected to the influence of the heated air which, at the point of entering the casing, has a temperature of about 125 degrees F., and that the roll should rotate at such speed that the film is subjected to the influence of such degree of heat for a period of about eighty seconds. This has been found to produce a product having less than three and one-half per cent. of moisture, which is the best commercial form for desiccated milk. It is to be understood, however, that the roll may be rotated more rapidly if air of a higher temperature be employed and other alterations be made as to the temperature of the air and the speed of rotation of the roll, as will be readily understood by those familiar with the art and without departing from the spirit of this invention.

In thus subjecting the film to heated air introduced thereonto at several points, a rapid absorption of the moisture takes place as air entering at any one of the points is removed before it becomes saturated. Furthermore, after the film has been subjected to a current of dry, heated air, it passes into the zone of influence of another current flowing in a direction contrary to the direction of movement of the film and thus as the film approaches a state of dryness it is progressively subjected to air of a continually drier nature until it attains the required state of dryness. By this method, although a considerable volume of air is required, it may be of comparatively low temperature and still rapidly dry the film.

Below the inlet 18 is situated a knife 21 preferably extending the full width of the face of the roll and mounted on a bracket 22 that may be secured in any approved manner to the framework of the roll or separate standards may be used if so desired. This knife is adjustable and contacts the face of the roll to scrape the dried film, indicated at 23, from the roll. Although the product is dry and somewhat brittle at the time of its removal from the roll yet it has substantially the identity of a film in particles of greater or less size but sufficiently broken to allow it to be delivered onto a traveling belt 24, or other convenient type of conveyer, from which it is delivered into the boot 3 of the bucket elevator 4. This elevator delivers the product into the shaker 5 in the upper closed compartment. As indicated in Fig. 1, the shaker consists of several inclined pans, the lower ends of which in each instance are arranged to allow the material to pass therefrom by a shaking movement thereof. The several pans are yieldably suspended by the arms 30 and may be shaken in any approved manner, as for instance, by the wheel 31 and a pitman 32 connected with the shaker frame. Rotation of the wheel will oscillate the framework and the material in an upper pan is thus moved progressively into the next lower pan and is finally delivered onto the inclined trough 33, which empties into the interior of the tumbler 7.

To the outlet 20 of the casing 17 of the roll is connected the discharge conduit 34 leading upward into the said upper compartment and preferably adapted to discharge the hot air from the drying apparatus across and through the material while on the shakers 5, to further dry the same if desired. Preferably, however, dry, heated air from another source may be directed into the compartment or across the shakers if it be desired not to completely dry the material while on the roll. This upper compartment is to be understood as being closed with the exception of the discharge opening 40 in one side thereof through which the air from the discharge conduit 34 may pass out from the compartment. This opening 40 may be screened if so desired, to prevent particles of the product from passing out with the air, but as the product is not to any great extent in the form of powder while on the shakers, the provision of the screen may be dispensed with. It is to be understood that the material as it comes to the shakers is very light, being much of the nature of very thin shavings of various sizes and some of it crumbled to a greater or less extent. In order that air passing into the compartment from the conduit 34 or other source may not blow the product about the compartment, the shakers may be screened as indicated in dotted lines 50, leaving a passageway 51 to allow the material to pass from the lower pan onto the trough 33. It is also to be further understood that it is not necessary to subject the material to a draft of warm air while on the shakers and that the said air may pass directly to atmosphere to one side of the shaker 5 so as not to influence the material thereon except indirectly by maintaining the compartment comparatively warm which is its most useful function. If the exhaust air does not pass over the product while on the shakers, the drying roll should be operated in such manner as to produce the required dryness of the product preparatory to the tumbling operation.

The screen tumbler 7 is preferably housed in a casing 41 practically entirely inclosing the same with the exception of the opening 42 thereinto through which the trough 33 may be inserted. This tumbler may be supported by a shaft 43 at one end and a large hollow trunnion 44 at the other end. This trunnion and shaft may be carried in brackets as shown, and the shaft 43 is provided with a belt-wheel 45 by means of which it may be rotated by power. This screen is to be continuously rotated during the reception of material thereinto, and the material being brittle and readily broken up, the continuous tumbling thereof of about the screen gradually reduces it to a granular form. With a sixty to eighty mesh screen the particles passing therethrough are substantially of the same size as the grains in granulated sugar which has been found to be sufficiently small for all purposes being readily and wholly soluble in water. To hasten the disintegration of the product in the tumbler, balls or the like formed of a hard material may be placed therein to roll about the screen and crush the material.

The casing 40 terminates at the lower side of tumbler in a hopper and discharge conduit 8 closed at the bottom by the gate 9. By opening this gate, a receptacle, as a barrel for instance, may be filled with material or the material may be drawn into cases of any approved type and subsequently packaged in any approved manner.

In the apparatus shown air entering the inlet 19 of the casing 17 may be either warmer or colder than the air entering the inlet 18 as may be found most serviceable in use. In such event the inlets 18 and 19 should be supplied with air from separate sources having individual heating apparatus so that the temperatures may be varied either to heat the fluid more rapidly during the early part of its treatment or at the finish thereof.

From the foregoing description it becomes evident that but comparatively little heat is required to perform the work, and that the temperature of air being low, no detrimental chemical or physical change (as coagulation of the albumin in milk) is produced and the flavor or taste of the product is unaltered. With this method the roll is not heated in any way except as it becomes heated by reason of the flow of heated air through the surrounding casing, and thus a regulation of the volume of the air and the temperature thereof perfectly regulates the degree of heat to which the fluid is subjected during the drying operation. Also, if desired, by further subjection of the material to the same or other heated air after its removal from the roll, additional moisture may be removed and the product delivered into the tumbler in the required state of dryness. As the drying of the fluid takes place at a temperature and in a manner incapable of producing a detrimental chemical or physical change in the solids, a product is obtained that is of the highest commercial value. It is to be noted that the casing 17 should fit closely about the roll to practically prevent introduction of atmospheric air thereinto and also prevent loss of the dry heated air. Atmospheric air contains moisture and its introduction into the casing is detrimental as it reduces the moisture absorbing quality of the air passing therethrough. By the use of dry heated air, the drying operation is performed very rapidly and economically.

Desiccated milk produced by this process is found to be superior to that produced by other processes within my knowledge and may be distinguished from the desiccated milk produced by such other processes, in that it is more readily and completely soluble in water. When placed in water the product of my process quickly sinks to the bottom of the container whereupon by simply stirring slightly the entire mass is dissolved, and when so mixed with water in proper proportions, a fluid having the natural aroma and flavor of fresh milk is obtained. With my process full cream milk may be desiccated and reduced to a dry, granular form, and as the globules of fat have not been broken in the process, cream will be found to rise on the fluid produced therewith. Such result has not before been attained in this art, as the former processes involve so great a heat or otherwise produce such chemical and physical changes as produce an unnatural flavor and aroma of the fluid produced therewith. Such former products on placing in water are not readily and quickly soluble as they tend to float in small masses or lumps on the surface thereof and considerable agitation is required to break up and dissolve the entire mass. Desiccated milk produced by my process is characterized by the rapidity with which it dissolves in water, by the natural flavor and aroma of fluid so formed and by the granular form which it retains even when crushed very fine by passing through rolls.

In the desiccation of milk by my process the fluid is preferably previously condensed at a temperature not exceeding 140 degrees F. in order that no detrimental chemical or physical change may take place in the solids and the term "fluid" as herein used is to be understood as including any liquid containing solids either in its natural or a condensed state.

Briefly stated, my process consists essentially in the following steps, first—reducing the fluid to a thin film, second—subjecting it to a current of air having a temperature below that capable of producing detrimental chemical or physical change and for a period sufficient to absorb the moisture to the required extent, and finally reducing it to a form suitable for commercial use.

Having thus described my improved process of desiccating milk or other fluids, and apparatus by which it may be performed, what I claim and desire to secure by Letters Patent of the United States is—

1. The herein described method of desiccating fluids containing solids consisting in coating a heated surface with a thin film of liquid, subjecting the film thereon to a current of heated air for a period sufficient to remove the greater part of its moisture, removing the partially dried film from the surface, and agitating and breaking up the removed film to the desired final form while in the current of air passing from the said surface.

2. The herein described process of desiccating milk or other fluids containing solids consisting in subjecting the fluid while in the form of a thin film to a current of heated air having a temperature below that capable of producing a detrimental, chemical or physical change in the material treated and for a period sufficient to remove the greater part of its moisture, breaking up the film and subjecting it to the heated air as it passes from the film, and reducing the dried material to the desired uniform granular character while subject to influence of said heated air.

3. The herein described method of desiccating milk or other fluids consisting in first—concentrating the fluid by heating at a temperature not greater than 140 to 145 degrees F., second—coating a traveling surface with the condensed fluid to form a film thereon and subjecting the same to a current of air having a temperature not greater than 145 degrees F. to remove the greater percentage of moisture, third—removing the film from the surface and subjecting the partially dried material while being agitated to the same current of air as it passes from the surface, and while under the influence of said air current reducing the material to the desired granular form.

4. Apparatus for manufacture of desiccated milk and the like comprising a heated roll, means for coating the surface with a film of liquid to be desiccated, means for subjecting the film on the roll to a current of heated air to remove the greater percentage of its moisture, a scraping device for removing the partially dried film from the roll, an agitating device, means for delivering the partially dried and broken film thereto whereby it may be shaken up, means for delivering the air as it passes from the roll through the material in the agitating device, and a pulverizing device to which the material is discharged from the agitator, the pulverizing device being subjected to influence of the air passing through the agitated material.

5. The herein described method of desiccating fluids consisting in continuously coating the surface of a roll with a film of the fluid, subjecting the film to a current of heated air while on the roll to remove a greater part of the moisture, removing the partially dried film from the surface of the roll in a manner to break up and disintegrate the same, then subjecting the broken film to the heated air as it passes from the roll and maintaining the material therein until the required state of dryness is attained, and finally, delivering the dried film into a tumbler provided with a screen of the desired mesh through which the material may be discharged.

In testimony whereof, I sign this specification.

CHARLES E. ROGERS.